United States Patent [19]

Minakuchi

[11] 4,114,075
[45] Sep. 12, 1978

[54] ROTATION CONTROL SYSTEM

[75] Inventor: Hiroshi Minakuchi, Shiga, Japan

[73] Assignee: Matsushita Electric Industrial Co., Ltd., Kadoma, Japan

[21] Appl. No.: 818,842

[22] Filed: Jul. 25, 1977

[30] Foreign Application Priority Data

Jul. 26, 1976 [JP] Japan .................................. 51-89440
Apr. 20, 1977 [JP] Japan .................................. 52-46259

[51] Int. Cl.² .............................................. H02P 5/16
[52] U.S. Cl. .................................... 318/341; 318/318; 318/327
[58] Field of Search ............... 318/314, 318, 341, 326, 318/327, 328

[56] References Cited

U.S. PATENT DOCUMENTS 3,215,918 11/1965 Lichowski ........................... 318/328
3,970,909 7/1976 Minakuchi .......................... 318/341

Primary Examiner—David Smith, Jr.
Attorney, Agent, or Firm—Stevens, Davis, Miller & Mosher

[57] ABSTRACT

Rotation of a rotary machine, e.g. a dc motor is controlled with higher accuracy by the system comprising a rotation speed detector for generating a signal having a repetition frequency dependent on the rotation speed of the rotary machine, a phase comparator having two input terminals one of which is applied with the output signal of the rotation speed detector, a voltage controlled oscillator applied with the output signal of the phase comparator, a frequency divider applied with the output of the voltage controlled oscillator and supplying the output to the other input terminal of said phase comparator, and a rotation speed controlling circuit having an input terminal applied with the output of the voltage controlled oscillator, i.e. a detection signal with a multiplied frequency.

5 Claims, 4 Drawing Figures

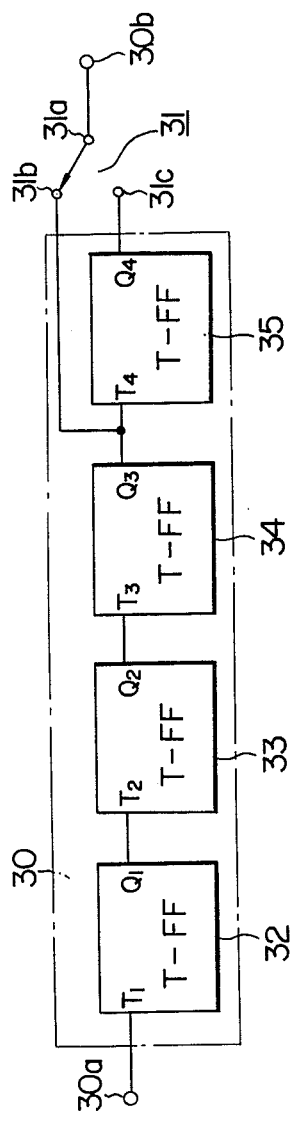
F I G. 3
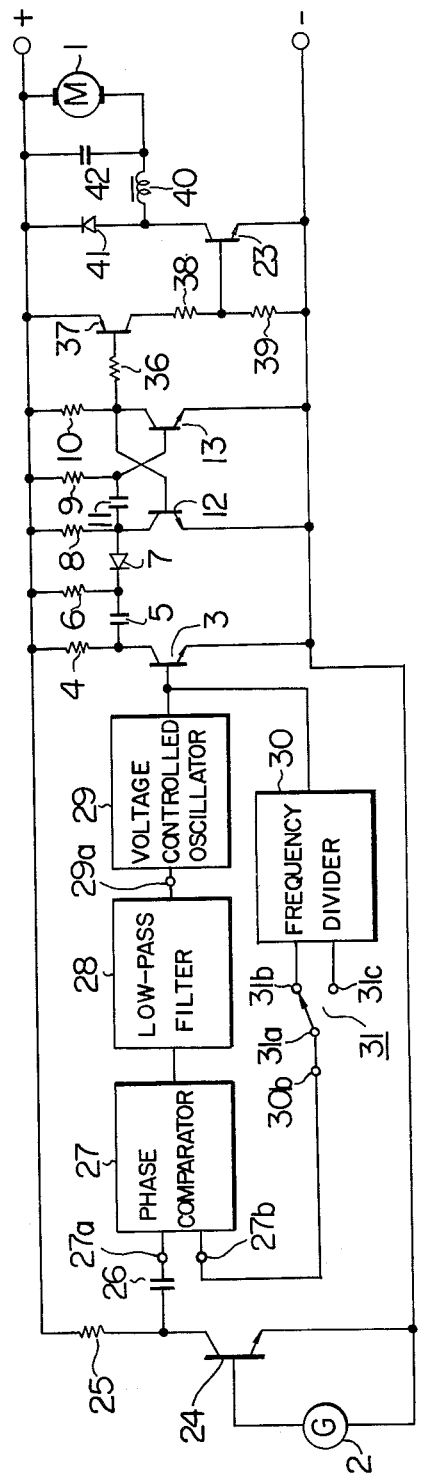
F I G. 4

ROTATION CONTROL SYSTEM

FIELD OF THE INVENTION

This invention relates to a rotation control system having reduced time delay in the control system and an improved control characteristic, and more particularly to a rotation control system capable of accurately varying the controlled rotation speed.

BRIEF DESCRIPTION OF THE DRAWINGS

FIG. 3 is a block diagram of an example structure of the frequency divider.

FIG. 4 is a circuit connection diagram of a rotation control system for a dc motor according to another embodiment of this invention.

DESCRIPTION OF THE PRIOR ART

Figure 1:
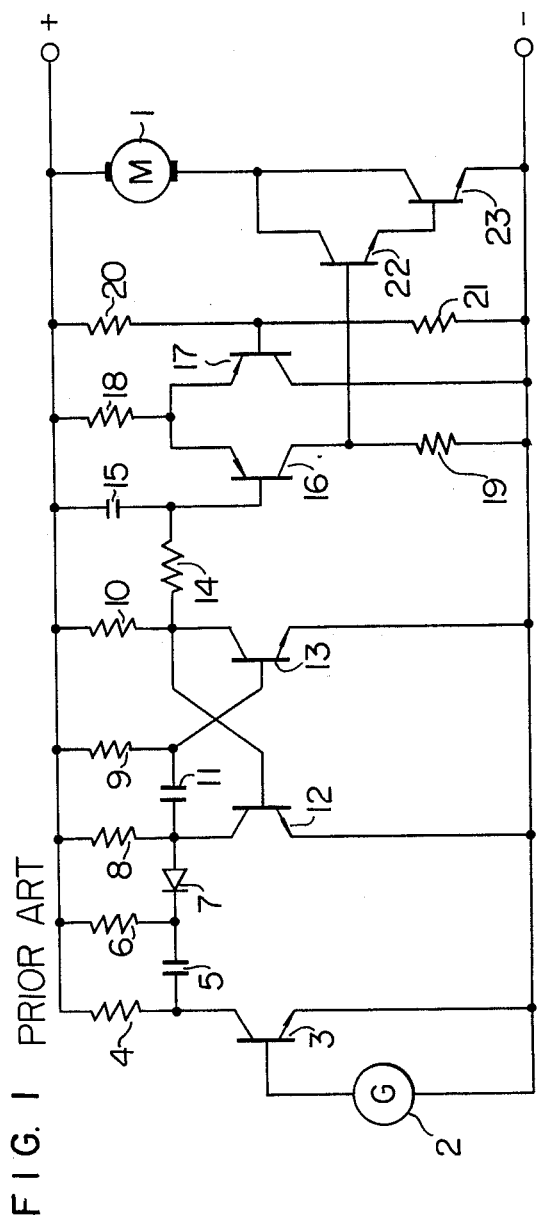
FIG. 1 is a circuit connection diagram of an example of the conventional rotation control system.

Conventionally, such rotation control systems as one shown in FIG. 1 have been used.

FIG. 1 shows an example of a rotation control system for a dc motor, in which a rotation speed detector 2 coupled to a dc motor 1 for generating an ac output signal having a repetition frequency dependent on the rotation speed of the dc motor 1. The ac output signal is applied to the base of a waveform shaping amplifier transistor 3 and the collector side output signal of the transistor 3 is applied to a negative trigger pulse generator formed of a capacitor 5, a resistor 6, a diode 7 and a resistor 8.

The output side of the negative pulse generator is connected to a monostable multivibrator formed of resistors 8, 9 and 10, a capacitor 11 and transistors 12 and 13. The output side of the monostable multivibrator, i.e. the two ends of the resistor 10, is connected to an integration circuit formed of a resistor 14 and a capacitor 15.

The output of the integration circuit is applied to a comparator circuit formed of transistors 16 and 17 and resistors 18, 19, 20 and 21. The collector of the transistor 16 is connected to the base of a transistor 22.

Another transistor 23 forms Darlington connection with the transistor 22 and the dc motor 1 to be monitored and controlled by the above structure is connected to the collector of the transistor 23.

The operation of the speed control system for a dc motor shown in FIG. 1 will be outlined next. The rotation speed detector 2 generates an ac voltage of a frequencing proportional to the rotation speed of the dc motor 1 at the output side. During the positive half cycle of this ac signal, a base current flows into the transistor 3 and a square wave signal having the same frequency as the output signal of the rotation speed detector 2 appears across the collector resistor 4.

This square wave signal is differentiated by the capacitor 5 and the resistor 6 to generate positive and negative trigger pulses across the resistor 6.

The detection circuit formed of the diode 7 and the resistor 8 transmits only the trigger pulses of the negative polarity among those of the positive and negative polarities and applies them to the monostable multivibrator in the next stage. A square wave signal having the same frequency, i.e. repetition frequency, as that of the output signal of the rotation speed detector 2 and a duty period of high voltage state determined by the resistance 9 and the capacitance 11 appears at the output side of the monostable multivibrator, i.e. the collector of the transistor 13.

The square wave output of the monostable multivibrator is supplied to the integration circuit formed of the resistor 14 and the capacitor 15. Then, a dc voltage varying with the rotation speed of the dc motor 1 is provided at the output side of the integrating circuit, i.e. at the base of the transistor 16. This dc voltage is compared with a reference voltage obtained by dividing the supply voltage in the voltage dividing resistors 20 and 21, i.e. the voltage at the base of the transistor 17. The comparison output is applied to the transistors 22 and 23 for driving the dc motor 1.

In this way, the rotation speed of the dc motor 1 is held constant in this system, since it is controlled in such a manner that the base voltages of the transistors 16 and 17 become substantially equal.

In such systems, it has been well known that the output frequency of the rotation speed detector 2 is preferably as high as possible.

Namely, in the system of FIG. 1, when the square wave output of the monostable multivibrator is transformed into a dc voltage in the integrating circuit, higher resolution, i.e. more accurate, control becomes possible as the ripple component in the output voltage of the integration circuit becomes smaller. For decreasing the ripple component, the time constant of the integrating circuit may be increased or the output frequency of the rotation speed detector may be increased. The former method leads to an increase in the time delay (phase delay) of the control system and hence introduces the possibility that the control operation becomes unstable, while the latter method is associated with the problem that the upper limit of the detection frequency is related with the mechanical accuracy and cannot be raised very high.

Further, switching drive of a dc motor is often used to reduce the power dissipation. In such a case, if the output frequency of the rotation speed detector is high enough, a switching carrier generator which has been necessary for the switching drive becomes no longer necessary.

In this way, it has been a strongly desired technique among those in this field to raise the output frequency of the rotation speed detector.

SUMMARY OF THE INVENTION

The rotation speed control system according to this invention eliminates the above drawbacks.

An object of this invention is to provide a rotation speed control system capable of providing a high output frequency by the circuit operation even when the output frequency of a rotation speed detector is low.

According to an aspect of this invention, there is provided a rotation speed control system for a rotary machine with the use of a rotation speed control circuit, comprising a rotation speed detector coupled to the rotary machine for generating a signal having a repetition frequency dependent on the rotation speed of the rotary machine, a phase comparator having two input terminals one of which is applied with the output signal of the rotation speed detector, a voltage controlled oscillator having a control input terminal applied with the output signal of the phase comparator, and a frequency divider for dividing the frequency of the output signal of the voltage controlled oscillator and applying the output signal to the other input terminal of the phase comparator, the output signal of the voltage controlled oscillator being applied to the detection signal input terminal of the rotation speed control circuit.

DESCRIPTION OF THE PREFERRED EMBODIMENTS

Figure 2:
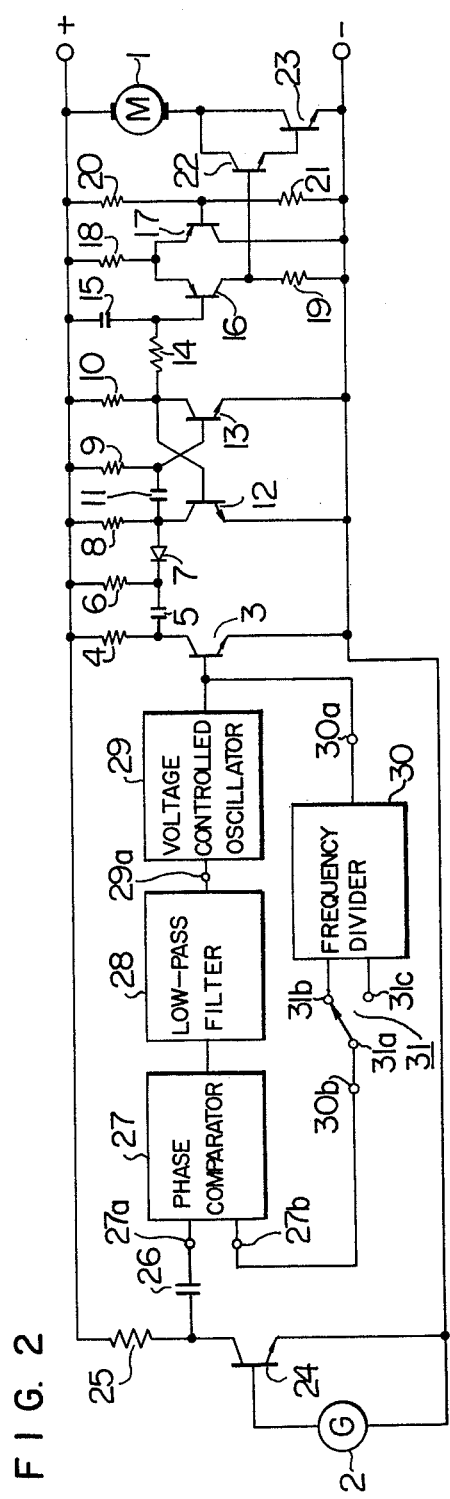
FIG. 2 is a circuit connection diagram of a rotation control system for a dc motor according to an embodiment of this invention.

FIG. 2 shows a circuit connection diagram of the rotation speed control system for a rotary machine according to an embodiment of this invention.

In FIG. 2, reference numerals similar to those of FIG. 1 denote similar parts. The output signal of a rotation speed detector 2 is applied to the base of a waveform shaping transistor 24 the collector of which is connected to a positive supply voltage line through a resistor 25. The output signal, i.e. the voltage at the collector, of the transistor 24 is supplied to one input terminal 27a of a phase comparator 27 through a capacitor 26.

The output signal of the phase comparator 27 is applied to a control input terminal 29a of a voltage controlled oscillator 29 through a low-pass filter 28. The output signal of the voltage controlled oscillator 29 is, on one hand, fed back to the other input terminal 27b of the phase comparator 27 through a variable frequency divider 30 and, on the other hand, is applied to the base of a waveform shaping transistor 3.

In the frequency divider 30, a dividing ratio changeover switch 31 is provided. When a movable contact 31a of the switch 31 is turned to a fixed contact 31b, the dividing ratio of the frequency divider 30 is ⅛ while it is 1/16 when the movable contact 31a is turned to a fixed contact 31c.

Such a frequency divider of a variable dividing ratio can be formed of a combination of flip-flops, as seen in the example shown in FIG. 3. Frequency dividers capable of gradually varying the dividing ratio are well known as the programmable frequency divider or counter.

FIG. 3 shows a basic example of the frequency divider structure. A first, a second, a third and a fourth T flip-flops 32, 33, 34 and 35 are connected in series between an input terminal 30a and an output terminal 30b. The output $Q_3$ of the third T flip-flop 34 is applied to the fixed contact 31b of the changeover switch 31 and the output $Q_4$ of the fourth T flip-flop 35 is applied to the other fixed contact 31c of the change-over switch 31. The movable contact 31a of the switch 31 is connected to the output terminal 30b.

Since the frequency dividing ratio per one flip-flop is ½, the frequency divider shown in FIG. 3 provides a frequency dividing ratio of ⅛ between the input terminal 30a and the output terminal 30b when the movable contact 31a of the switch 31 is connected to the fixed contact 31b, and a frequency dividing ratio of 1/16 between the input terminal 30a and the output terminal 30b when the movable contact 31a of the switch 31 is connected to the other fixed contact 31c.

In the circuit of FIG. 2, the phase comparator 27, the low-pass filter 28 and the voltage controlled oscillator 29 constitute a well-known phase-locked loop (PLL) with the feed-back line including the frequency divider 30. Circuit structures and operations of the respective blocks are well known. Thus, further description is omitted.

A typical example of the bipolar IC including a phase comparator and an amplifier for use as a low-pass filter is one known as MC4044 available from Motorola Inc. and a typical example of the bipolar IC including a voltage controlled oscillator is one known as MC4024 available from Motorola Inc.

In the circuit of FIG. 2, the oscillation frequency of the voltage controlled oscillator 29 which is a constituent of the phase locked loop is so controlled by the loop that the phase difference of the two input signals of the phase comparator 27 becomes zero. Here, since the frequency divider 30 of a dividing ratio ⅛ or 1/16 is inserted in the loop, the output frequency of the voltage controlled oscillator becomes 8 or 16 times as large as the output signal frequency of the rotation speed detector 2.

Namely, denoting the output frequencies of the rotation speed detector 2 and the frequency divider 30 as $f_g$ and $f_d$ and the oscillation frequency of the voltage controlled oscillator 29 as $f_o$, there hold relations $$f_o = 8 f_d \qquad (1)$$

when the movable contact 31a of the switch 31 is connected to the fixed contact 31b, and $$f_o = 16 f_d \qquad (2)$$

when the movable contact 31a of the switch 31 is connected to the other fixed contact 31c.

Since the phase difference of the input signals of the phase comparator 27 is controlled by the phase locked loop to become zero, there holds $$f_g = f_d \qquad (3)$$

From equations (1) and (3), $$f_o = 8 f_g \qquad (4).$$

From equations (2) and (3), $$f_o = 16 f_g \qquad (5).$$

As is apparent from equations (4) and (5), the base of the waveform shaping transistor 3 is applied with a signal of a frequency 8 or 16 times as high as that of the signal applied to the base of the transistor 24.

This gives an equivalent effect to that given by an output signal of the rotation speed detector having a frequency 8 or 16 times as high as the real value. Thus, the time constant of the monostable multivibrator determined by the resistance 9 and the capacitance 11 can be reduced and also the time constant of the integrating circuit determined by the resistance 14 and the capacitance 15 can be reduced. Then, the phase delay in the control circuit can be reduced very small and a stable control operation can be expected.

Further, the rotation speed of the dc motor 1 can be accurately doubled by the change-over of the switch 31.

Here, although the frequency dividing ratio in the frequency divider 30 can be changed over only in two ways ⅛ and 1/16 in this embodiment, the rotation speed of the dc motor 1 can be varied stepwise or in a wide range by employing a variable frequency divider generally known as the programmable frequency divider or counter.

In the rotation speed control system for a rotary machine shown in FIG. 2, the system is coupled to or combined with a rotary machine, i.e. a dc motor, the output signal of the rotation speed detector 2 for generating a signal having a repetition frequency dependent on the rotation speed of the dc motor 1 is applied to one input terminal 27a of a phase comparator 27, the output signal of the phase comparator 27 is applied to the control input terminal 29a of a voltage controlled oscillator 29 through a low-pass filter 28, the output signal of the voltage controlled oscillator 29 is applied to a frequency divider 30, the output signal of the frequency divider 30 is applied to the other input terminal 27b of the phase comparator 27, and the output signal of the voltage controlled oscillator 29 is applied to a detection signal input terminal of a rotation control circuit for the rotary machine constituted of transistors 3, 12, 13, 16, 17, 22 and 23, resistors 4, 6, 8, 9, 10, 14, 18, 19, 20 and 21, capacitors 5, 11 and 15, and a diode 7, i.e. to the base of the transistor 3.

The rotation speed control circuit comprises a frequency discriminator circuit formed of transistors 3, 12 and 13, the resistors 4, 6, 8, 9, 10 and 14, capacitors 5, 11 and 15 and diode 7, and a dc amplifier formed of transistors 16, 17, 22 and 23 and resistors 18, 19, 20 and 21. The rotation speed control circuit may also be formed of a frequency-duty converter circuit.

FIG. 4 shows another embodiment, in which the collector of a transistor 13 constituting a monostable multivibrator is connected to the base of a transistor 37 through a resistor 36, the emitter of the transistor 37 is connected to the positive power supply line, the collector of the transistor 37 is connected to the base of a transistor 23, and a resistor 39 is connected between the base and the emitter of the transistor 23.

The collector of the transistor 23 is connected to one power supply terminal of a dc motor 1 through a choke coil 40 and the other power supply terminal of the dc motor 1 is connected to the positive power supply line.

Further, a diode 41 is connected in reverse direction between the collector of the transistor 23 and the positive power supply line, and a capacitor 42 is connected between the power supply terminals of the dc motor 1.

In FIG. 4, a frequency-duty converter circuit is formed of transistors 3, 12, 13, 23 and 37, resistors 4, 6, 8, 9, 10, 36, 38 and 39, capacitors 5 and 11, and a diode 7.

Namely, since the transistor 13 constituting the monostable multivibrator becomes turned off for a certain period everytime when a negative trigger pulse is applied to the base thereof, the collector signal waveform is subjected to such change that the changes in the repetition frequency of the trigger pulse, i.e. the output frequency of the voltage controlled oscillator, are converted into the changes in the duty cycle.

For example, when the output signal frequency of the voltage controlled oscillator 29 is increased, the duration of the off-state of the transistor 13 becomes longer compared to that of the on-state. This means that the duty of the square wave signal appearing at the collector of the transistor 13 is varied.

The signal waveform at the collector of the transistor 13 is current-amplified in the transistors 37 and 23 to switching-drive the dc motor 1.

When the dc motor 1 is switching-driven to minimize the power loss in the power transistor (transistor 23 in FIG. 4) inserted in series between the dc motor and the power source, the switching period should be sufficiently small compared to the electrical time constant of the dc motor. Namely, as it is well known that the switching frequency should be as high as possible, a switching signal of a required high frequency can be easily provided in the system of FIG. 4 by setting the frequency dividing ratio of the frequency divider 30 sufficiently low.

In FIG. 4, the choke coil 40 and the capacitor 42 constitute a smoothing circuit for smoothing the switching signal. Continuous power supply to the dc motor 1 is achieved by this smoothing circuit.

The diode 41 is inserted for absorbing spike pulses of the reverse direction to raise the switching efficiency and for preventing the damage of the transistor 23 by surge pulses.

In the embodiments of FIGS. 2 and 4, the output signal of the phase comparator 27 is applied to the control input terminal of the voltage controlled oscillator 29 through the low-pass filter 28. The low-pass filter 28, however, can be dispensed with if the phase comparator provides an analog output.

Further, it will be apparent that the present control system is not only applicable to the rotation speed control of a dc motor but is also applicable to the rotation speed control of any other rotary machine.

As has been described above, according to the rotation speed control system for a rotary machine of this invention, the output signal of a rotation speed detector is applied to one input terminal of a phase comparator, the output signal of the phase comparator is applied to a control input electrode of a voltage controlled oscillator, the output signal of the voltage controlled oscillator is applied to a frequency divider, and the output signal of the frequency divider is applied to the other input terminal of the phase comparator, while the output signal of the voltage controlled oscillator is applied to a detection signal input terminal of a rotation speed control circuit for said rotary machine. Therefore, a signal of a frequency more than several times higher than that of the output signal of the rotation speed detector can be applied to the rotation speed control circuit, and a rotation speed control system having small time delay of the control and an excellent control characteristic can be provided. Further, the rotation speed can be accurately varied by varying the frequency dividing ratio of the frequency divider.

I claim:

1. A rotation speed control system for a rotary machine comprising:
   a rotation speed detector coupled to the rotary machine for generating a signal having a repetition frequency dependent on the rotation speed of the rotary machine;
   a phase comparator having two input terminals, one of which is applied with the output signal of said rotation speed detector;
   a voltage controlled oscillator having a control input terminal applied with the output signal of said phase comparator;
   a frequency divider applied with the output signal of said voltage controlled oscillator and supplying the output signal to the other input terminal of said phase comparator; and
   a rotation speed controlling circuit for said rotary machine, having a detection signal input terminal applied with the output signal of said voltage controlled oscillator.

2. A rotation speed control system according to claim 1, wherein said rotation speed controlling circuit comprises a frequency discriminating circuit and a dc amplifier circuit applied with the output signal of said frequency discriminating circuit.

3. A rotation speed control system according to claim 1, wherein said rotation speed controlling circuit comprises a frequency-duty converter circuit.

4. A rotation speed control system according to claim 2, wherein said frequency divider has a variable frequency dividing ratio so that the rotation speed of said rotary machine can be varied by varying the frequency dividing ratio of said frequency divider.

5. A rotation speed control system according to claim 3, wherein said frequency divider has a variable frequency dividing ratio so that the rotation speed of said rotary machine can be varied by varying the frequency dividing ratio of said frequency divider.

* * * * *